ABSTRACT OF THE DISCLOSURE

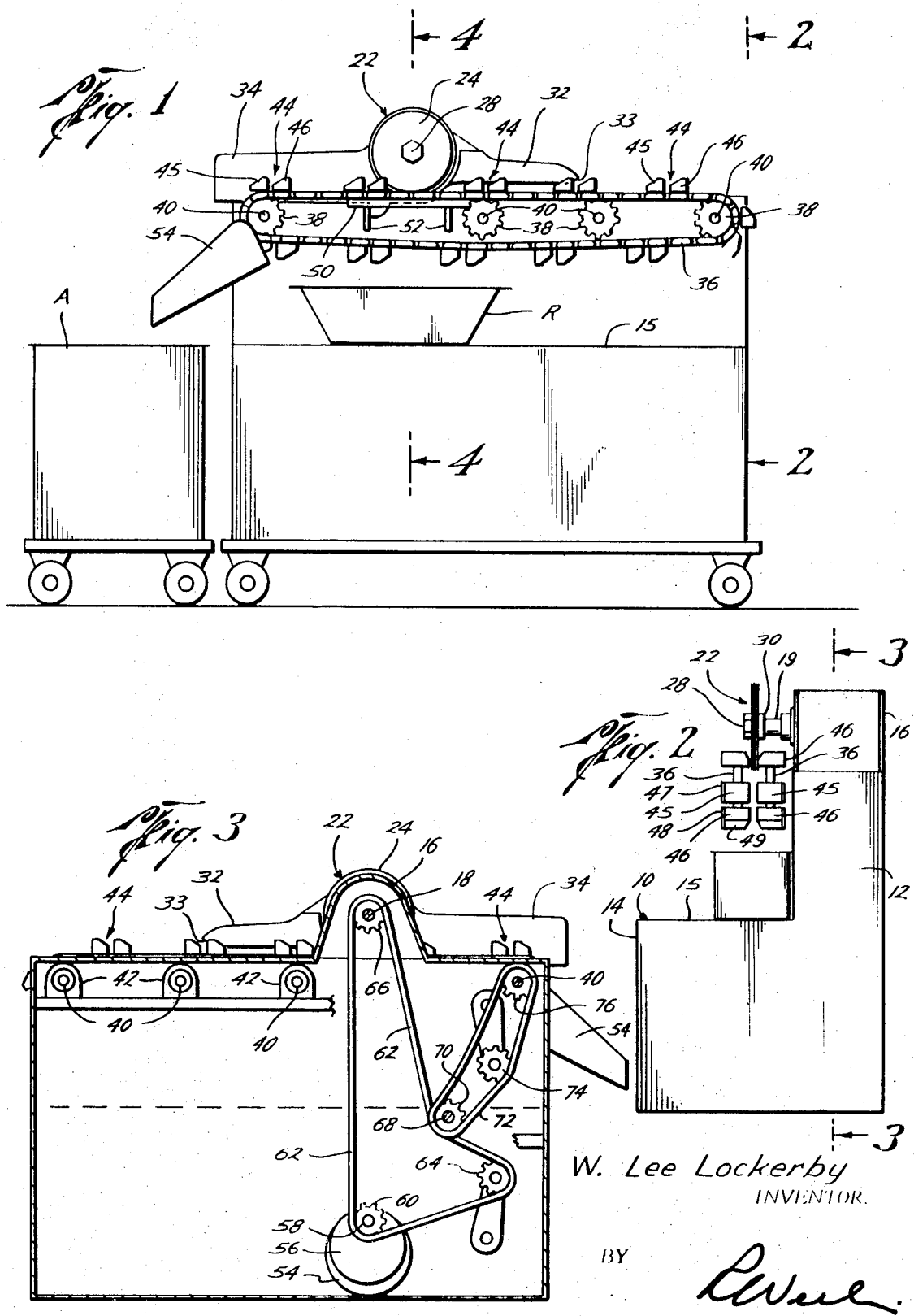

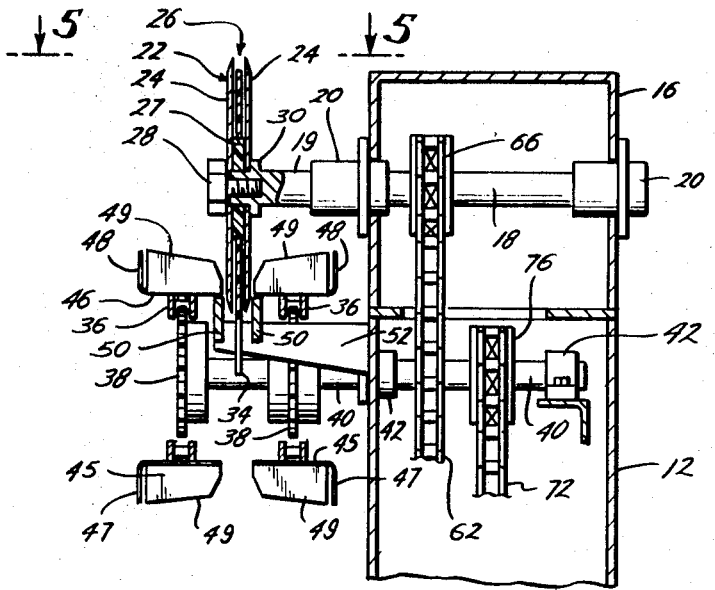
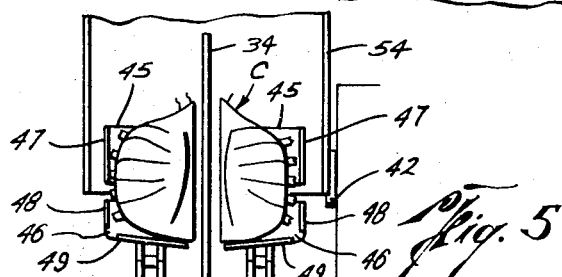
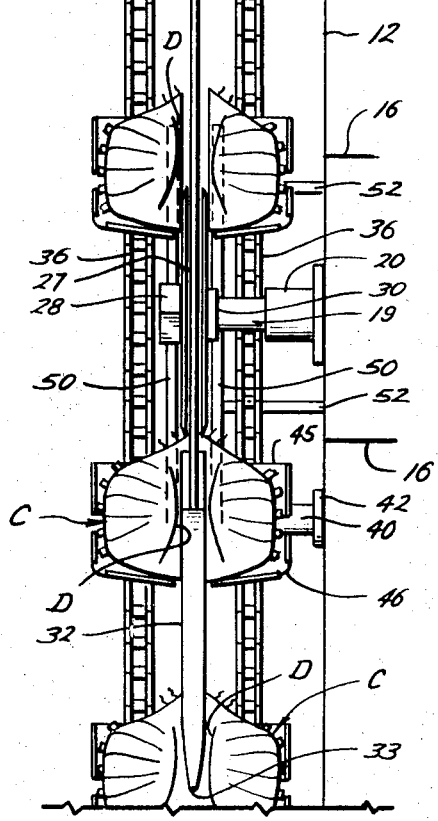
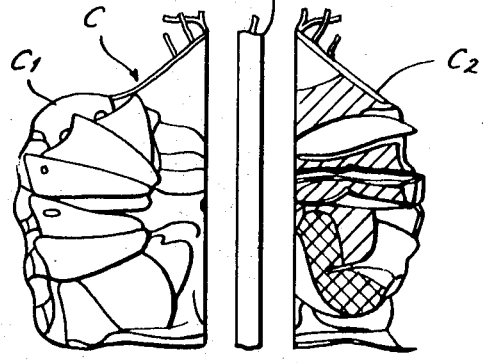
W. Lee Lockerby
INVENTOR 3,611,478
APPARATUS FOR CUTTING CRAB BODIES
W. Lee Lockerby, 13511A Northshore Drive,
Houston, Tex. 77015
Filed Aug. 21, 1969, Ser. No. 852,059
Int. Cl. A22c 29/00
U.S. Cl. 17—71
5 Claims

A machine for cutting crab bodies into half sections while employing a double bladed cutter for removing the central longitudinal partition between the sections in order to expose the inner ends of the meat-containing compartments of both body sections for removal of the meat therefrom.

RELATED APPLICATION

Reference will be made herein to my copending patent application, Ser. No. 697,966, filed Jan. 15, 1968.

BACKGROUND

Various machines have heretofore been designed for mechanical removal of meat from the compartments defined by numerous partitions in crab bodies. Various forms of such machines require cutting the body sections into various shapes in order to expose the meat-containing compartments to the apparatus by which the meat is extracted. The machines heretofore designed for preparing the crab bodies for subjection to the extraction apparatus have been unsatisfactory in that considerable wastage of the meat is involved and usually requires manual labor to prepare them properly.

In my copending application Ser. No. 697,966, I have disclosed a machine which employs centrifugal force for removing the meat from the compartments of the crab body sections. However, the body sections must be cut apart centrally and the central partition removed to expose the inner ends of the meat-containing compartments so that the sections, when subjected to suitable centrifugal force, will permit the meat to be expelled in a desirable manner.

The present invention is designed to cut the crab bodies into half-sections while removing the central partition in order to properly prepare the half-sections for use in an extraction machine. It should be understood that the present machine, by removing the central partition while separating the half-sections of the body, will serve to prepare the half-sections, particularly for extraction apparatus using either centrifugal force or suction to remove the meat from the compartments.

In accordance with a preferred embodiment of this invention, the apparatus comprises a cutter head and a conveyor fitted with receptacles for holding crab bodies and arranged to present them to the edges of a pair of rotationally driven, narrowly spaced, circular saws or cutters mounted in the cutter head. The spacing between the cutter blades is such as to place them closely adjacent opposite sides of the central partition which extends longitudinally of the crab body. A guide and holder for positioning and guiding the crab body into the cutters is incorporated into the cutter head structure to provide, in combination with the cutters, a highly efficient means for dividing the crab body in two half-sections, with a minimum of loss of desirable meat.

Other and more specific objects and advantages of this invention will become more readily apparent from the following detailed description when read in conjunction with the accompanying drawing which illustrates one useful embodiment in accordance with this invention.

In the drawing:
FIG. 1 is a side elevational view of the machine;
FIG. 2 is an elevational view looking toward the front end of the machine;
FIG. 3 is a vertical section taken along line 3—3 of FIG. 2;
FIG. 4 is a transverse sectional view taken along line 4—4 of FIG. 1;
FIG. 5 is a top plan view looking along line 5—5 of FIG. 4; and
FIG. 6 is an exploded view showing somewhat diagrammatically the two sections of a crab body and the central partition after separation, the covering shell being shown removed from one of the half-sections to illustrate the general form and arrangement of the heat-containing compartments therein.

Referring to the drawing, the apparatus is housed in a cabinet, designated generally by the numeral 10, of generally L-shaped form in vertical cross section, including an upward extension 12 defining with the base portion 14 a shelf 15. Surmounting extension 12 is a housing 16 enclosing a shaft 18 which extends transversely of the housing and is journalled in bearings 20—20 mounted in the opposite walls of the housing. Shaft 18 has an outboard end 19 which extends over shelf 15 and has mounted on its outer end the cutter head of the machine, designated generally by the numeral 22. Cutter head 22 includes a pair of narrowly spaced-apart circular cutter blades or saws 24—24 separated by a guide member, designated generally by the numeral 26, having a generally circular center section 27 rockably mounted about the portion of shaft end 19 between blades 24. The latter are affixed to shaft end 19 and are held in place thereon by means of a nut 28 which is screwed on the end of the shaft and jams the blades and the intervening guide member against a shoulder 30 provided on shaft 18. Guide member 26 also includes elongate forward and rearward extensions 32 and 34 integrally formed with center section 27. The forward end of extension 32 is upwardly curved from its lower edge to form the nose 33.

A pair of parallel, endless chain conveyor belts 36 are mounted about pairs of longitudinally spaced sprockets 38, each pair of sprockets being mounted on a common shaft 40 which extends into housing extension 12 and is journalled in bearings 42—42. The belts are spaced apart so as to be disposed on opposite sides of cutter head 22. The belts have mounted thereon in longitudinally spaced relation, a plurality of receptacles, designated generally by the numerals 44, each adapted to hold a crab body C in a position spanning the space between the belts so as to present the longitudinal center portion of the crab body to the cutter blades 24 as the belts move under the cutter head. For this purpose, each of the receptacles is of sectional construction, being divided longitudinally along the center into two longitudinally extending half-sections, each section being mounted on one of the belts 36 and spaced apart transversely to provide a space between the sections for accommodating the cutter head therebetween. Each of the half-sections is also divided transversely into a forward portion 45 and a rearward portion 46, these portions being separated sufficiently along the belts to permit articulation of the half-sections as they pass over the several sprockets over which the belts are trained. Each of the forward portions 45 is provided along its outer side edges with upstanding walls 47 and each of the rearward portions 46 is provided with upstanding outer side walls 48 and rear walls 49. The portions with their several walls cooperate to hold the crab body in position for engagement by the cutters.

A pair of parallel, spaced-apart, longitudinally extending back-up bars 50—50 are mounted in the space between the upper runs of belts 36, being fixedly supported on longitudinally spaced-apart brackets 52, 52 secured to the forward wall of cabinet extension 12. The back-up bars are positioned so that their upper edges will engage the undersides of the crab bodies as they move longitudinally over the bars so as to support the crab bodies against the downward pressures exerted by the cutters as they slice through the bodies. As best seen in FIGS. 4 and 5, the lateral spacing of the bars 50—50 is made such as to allow the edges of cutter blades 24 to pass between the bars as the blades slice through the center section of the crab body.

The generally conventional drive means for the belts and the cutters is housed in cabinet 10 and, as best seen in FIGS. 3 and 4, includes a suitable prime mover, such as an electric motor 54, which drives through a gear box 56 to a shaft 58 carrying a sprocket 60. A drive belt 62 is trained over sprocket 60, an idler sprocket 64 and a drive sprocket 66 mounted on cutter drive shaft 18. Belt 62 also drives a jack shaft 68 carrying a sprocket 70. A second belt 72 is trained over sprocket 70, idler sprocket 74 and thence over a sprocket 76 which is mounted on the inboard portion of one of the conveyor belt drive shafts 40. With this arrangement, the same prime mover will drive both the cutter head and the conveyor belts, the gear and sprocket ratios being selected in the conventional manner to provide appropriate drive speeds for these elements of the apparatus.

In operation, crab body C, which had previously been prepared by cooking, removal of the carapace, cleaning out the stomach and its contents, and removing the claws and feelers, will be placed in one of the receptacles 44 in the inverted position; that is, with the bottom shell facing upwardly. This bottom shell of the crab body is naturally formed with a longitudinal depression D along its center which overlies the central partition or "bone" which separates the meat-containing compartments in the opposite sides of the body. As the conveyor travels toward the cutter head carrying the body forward, the curved end 33 of extension 32 of the guide member will align with the depression D and will cooperate therewith to maintain the crab body in alignment with the edges of the cutter blades.

As the crab body passes over the back-up bars 50 the guide member will also serve to press the body downwardly against the back-up members and support it while the cutter blades cut through the crab body on opposite sides of the center partition. The center partition P so removed will drop through the space between the back-up bars and thence into a receptacle R mounted on shelf 15 below the cutter head. The split-apart body sections will continue their travel in the receptacle 44 to the discharge ends of the conveyor belts where they will drop onto a chute 54 from which they will be discharged into an accumulator A by which they will be transferred to the meat-extracting apparatus.

FIG. 6 illustrates, more or less diagrammatically, an exploded view of the portions of the crab body as formed by the action of the cutter head. These consist of the body sections $C_1$ and $C_2$, and the partition P which has been severed by means of the cutter head. The bottom shell of body section $C_2$ is shown removed to illustrate the several meat-containing compartments and the partitioning structure as commonly found.

It will be understood that various alterations and modifications may be made in the details of the illustrative embodiment without departing from the spirit of this invention.

What I claim and desire to secure by Letters Patent is:
1. Apparatus for splitting crab bodies, comprising:
    (a) a support;
    (b) cutter means rotatably mounted on said support;
    (c) crab body conveyor means movably mounted on said support constructed and arranged to present the longitudinal center portions of successive crab bodies to cutting engagement by said cutter means; and
    (d) said cutter means comprising a pair of narrowly spaced parallel circular cutter blades positioned to cut through said center portions on opposite sides of the central body partitions therein and closely adjacent the inner ends of the meat-containing compartments whereby to remove said partitions and thereby to divide said bodies into two half-sections and open the inner ends of their meat-containing compartments.
2. Apparatus according to claim 1 wherein said cutter means includes an elongate guide member mounted between cutter blades and disposed for longitudinal alignment with said center portions of the crab bodies as they approach said cutter means.
3. Apparatus according to claim 1 including back-up means mounted on said support beneath said cutter means for engaging the underside of said crab bodies on opposite sides of said center sections and having a longitudinal slot therein into which the lower segment of said cutter blades extend.
4. Apparatus according to claim 1 wherein said conveyor means comprises:
    (a) a pair of parallel endless belts spaced apart on opposite sides of said cutter means;
    (b) a plurality of longitudinally spaced crab body receptacles mounted on said belts to support crab bodies in positions to dispose said center portions over the space between said belts; and
    (c) means for driving said belts.
5. Apparatus according to claim 4 wherein said crab body receptacles are of multi-sectional, articulated construction comprising:
    (a) two half-portions mounted on the respective belts in transversely spaced-apart relation to admit said cutter blades therebetween; and
    (b) each of said half-portions comprising two longitudinally spaced-apart segments.

References Cited
UNITED STATES PATENTS

| | | | |
|---|---|---|---|
| 3,251,091 | 5/1966 | Altman | 17—71 |
| 3,495,294 | 2/1970 | Reinke | 17—54 |

LUCIE H. LAUDENSLAGER, Primary Examiner

U.S. Cl. X.R.

17—52